(12) United States Patent
Ayyadurai et al.

(10) Patent No.: US 11,220,351 B2
(45) Date of Patent: Jan. 11, 2022

(54) INTEGRATED SURFACE PROTECTION SYSTEM, COMPOSITE STRUCTURE, AND METHOD FOR PROTECTING THE SAME

(71) Applicant: The Boeing Company, Chicago, IL (US)

(72) Inventors: Mary S. Ayyadurai, Summerville, SC (US); Benjamin E. C. Koltenbah, Federal Way, WA (US); Quynhgiao N. Le, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 216 days.

(21) Appl. No.: 16/116,009

(22) Filed: Aug. 29, 2018

(65) Prior Publication Data

US 2020/0070998 A1 Mar. 5, 2020

(51) Int. Cl.
*B64D 45/02* (2006.01)
*B32B 15/092* (2006.01)
*B32B 5/02* (2006.01)
*B32B 15/20* (2006.01)

(52) U.S. Cl.
CPC .............. *B64D 45/02* (2013.01); *B32B 5/028* (2013.01); *B32B 15/092* (2013.01); *B32B 15/20* (2013.01); *B32B 2250/03* (2013.01); *B32B 2250/40* (2013.01); *B32B 2255/10* (2013.01); *B32B 2255/26* (2013.01); *B32B 2260/023* (2013.01); *B32B 2260/046* (2013.01); *B32B 2262/101* (2013.01); *B32B 2262/103* (2013.01); *B32B 2262/106* (2013.01); *B32B 2307/202* (2013.01); *B32B 2605/18* (2013.01)

(58) Field of Classification Search
CPC ..... B41M 5/502; B41M 9/00; B41M 2205/28
See application file for complete search history.

(56) References Cited

U.S. PATENT DOCUMENTS

| 5,324,766 A * | 6/1994 | Ikejiri | H05K 1/0346 524/433 |
|---|---|---|---|
| 2009/0258220 A1 | 10/2009 | Schaaf et al. | |
| 2010/0151239 A1* | 6/2010 | Hebert | B32B 27/065 428/351 |
| 2013/0271891 A1* | 10/2013 | Shimp | H02H 1/04 361/220 |
| 2014/0154496 A1* | 6/2014 | Sang | B32B 5/022 428/313.9 |
| 2016/0082691 A1* | 3/2016 | Restuccia | B32B 19/00 442/377 |

FOREIGN PATENT DOCUMENTS

DE  10 2007057491  6/2009
EP  2 759 563  7/2014

OTHER PUBLICATIONS

European Patent Office, Extended European Search Report, App. No. 19194189.7 (dated Jan. 23, 2020).
European Patent Office, "Communication pursuant to Article 94(3) EPC," App. No. 19 194 189.7 (dated Feb. 25, 2021).

* cited by examiner

*Primary Examiner* — Cheng Yuan Huang
(74) *Attorney, Agent, or Firm* — Walters & Wasylyna LLC

(57) ABSTRACT

An integrated surface protection system includes a single layer comprising an electrically conductive network and a fiber reinforcement material.

20 Claims, 4 Drawing Sheets

INTEGRATED SURFACE PROTECTION SYSTEM, COMPOSITE STRUCTURE, AND METHOD FOR PROTECTING THE SAME

FIELD

The present description relates to an integrated, multi-functional surface protection system that is suitable for placement on composite structures or parts, such as aircraft and aerospace composite structures and parts.

BACKGROUND

With increasing use of carbon fiber reinforced polymer (CFRP) materials, airplanes incorporate extensive lightning-strike protection features to ensure safety and compliance. Known systems include metal foil systems that include copper or aluminum foil, in expanded mesh form, that is embedded in a layer of polymer resin and thereafter laminated onto the composite structure.

In addition to lightning-strike protection features, several material layers are used in conjunction with the external side of a composite structure to provide UV protection, to minimize impact from drilling holes for fastener installations, and to provide a smooth finish for primer adhesion and paint application. Current state-of-the-art uses individual layers for each of these functions.

SUMMARY

In one embodiment, an integrated surface protection system includes a single layer comprising an electrically conductive network and a fiber reinforcement material.

In another embodiment, a composite structure includes a composite substrate, and a single layer on the composite substrate. The single layer includes an electrically conductive network and a fiber reinforcement material.

In yet another embodiment, a method of protecting a composite structure includes bonding an integrated surface protection system to a composite structure. The integrated surface protection system includes a single layer, and the single layer includes an electrically conductive network and a fiber reinforcement material.

Other embodiments of the disclosed integrated, multi-functional surface protection system will become apparent from the following detailed description, the accompanying drawings, and the appended claims.

DETAILED DESCRIPTION

According to the present description, many or all of the functionalities of multi-layer surface protection systems are incorporated in a single integrated surface protection system to provide for lightning-strike protection, to minimize impact from drilling holes for fastener installations, to provide UV protection, and/or to provide a smooth finish for primer adhesion and paint application. The integration of the components in the single system can decrease design weight and/or simplify processing and manufacturing. The single integrated surface protection system could also be optimized to ensure the robustness of the overall design as a system, which can result in overall systemic improvements.

In at least one example optimization, stress simulations have shown that addition of a fiberglass layer over a metallic expanded foil embedded within an epoxy coating layer reduces the thermal stress over a configuration without the fiberglass layer, based on thermal stress simulations due to temperature cycling between −55° C. and 70° C.

Disclosed is an integrated surface protection system having a single layer incorporating many or all of the functionalities of multiple layers of a multi-layer surface protection system. The integrated surface protection system includes an electrically conductive network for protection against lightning direct effects. The integrated surface protection system further includes a fiber reinforcement material to provide structural support for handling and automated lay down. The fiber reinforcement material is drill compatible and can improve the environmental durability with respect to temperature cycling. Due to the fiber reinforcement material, the integrity of an overlying paint layer can be maintained.

The disclosed integrated, multi-functional surface protection system can improve efficiency and/or reduce manufacturing costs. The disclosed integrated, multi-functional surface protection system can further ensure durability in service by providing lightning strike protection, mitigating the impact of hole drilling, and reducing thermal stresses.

Figure 1:
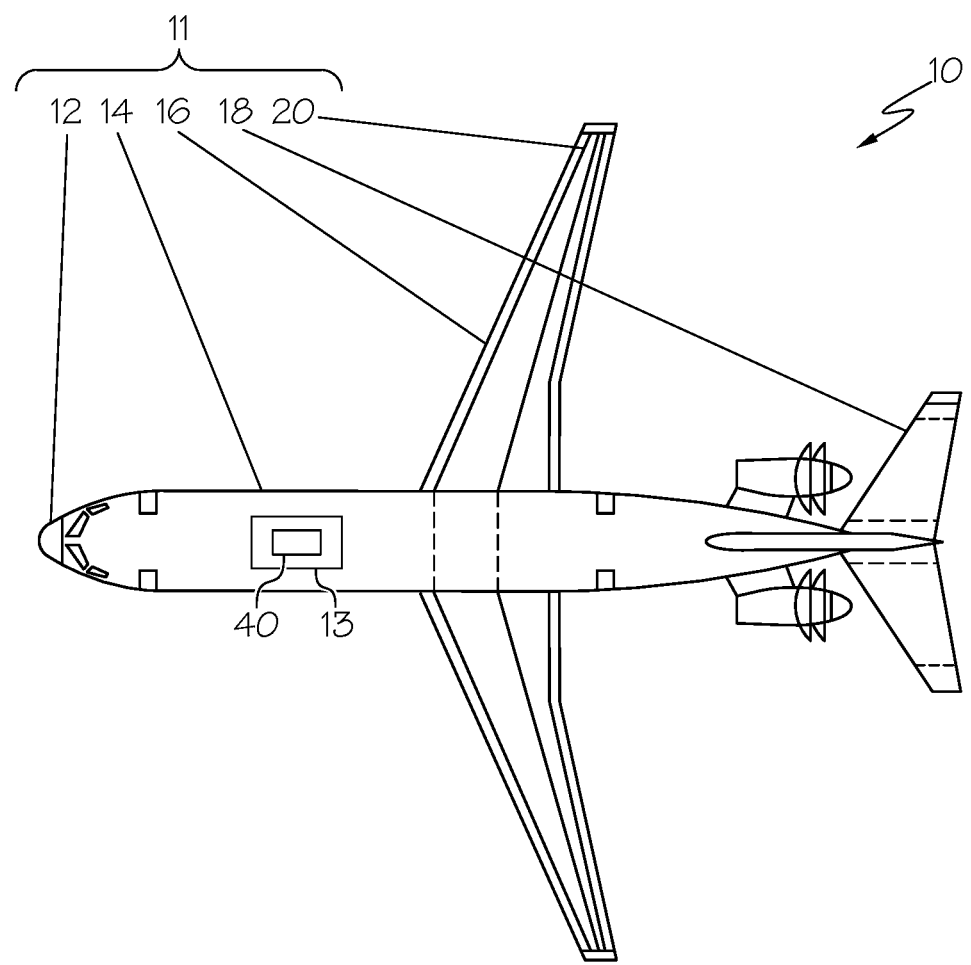
FIG. 1 is a top plan view of an aircraft showing various lightning strike zones of the aircraft.

FIG. 1 is a top plan view of an aircraft 10 showing various zones 11 of the aircraft 10. A component 13 of the aircraft 10 can be located in or form one or more of the zones 11. Such zones 11 of the aircraft 10 can be locations of the aircraft 10 having a relatively high probability of a lightning strike. The zones 11 may include a nose zone 12, fuselage zones 14, wing zones 16, tail zones 18, and wing tip zones 20. Although an aircraft 10 is shown and described herein, the integrated surface protection system 22 (shown in FIGS. 2 and 3) can be used on any suitable vehicle or other location where it is desirable to dissipate or conduct an electrical current.

Figure 2:
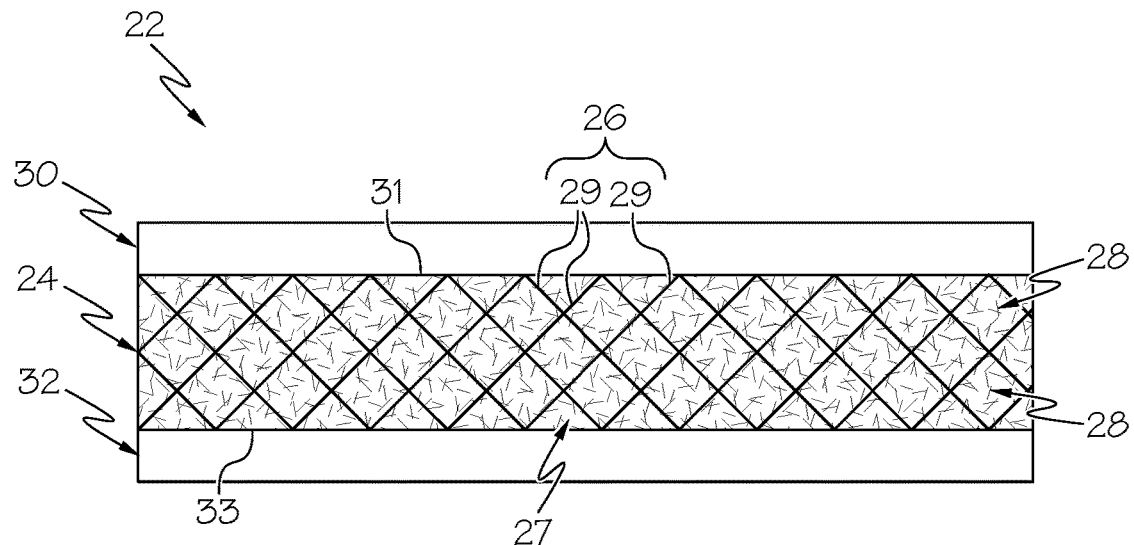
FIG. 2 is a schematic diagram showing an exemplary integrated surface protection system capable of protecting a composite structure of the aircraft of FIG. 1.
Figure 3:
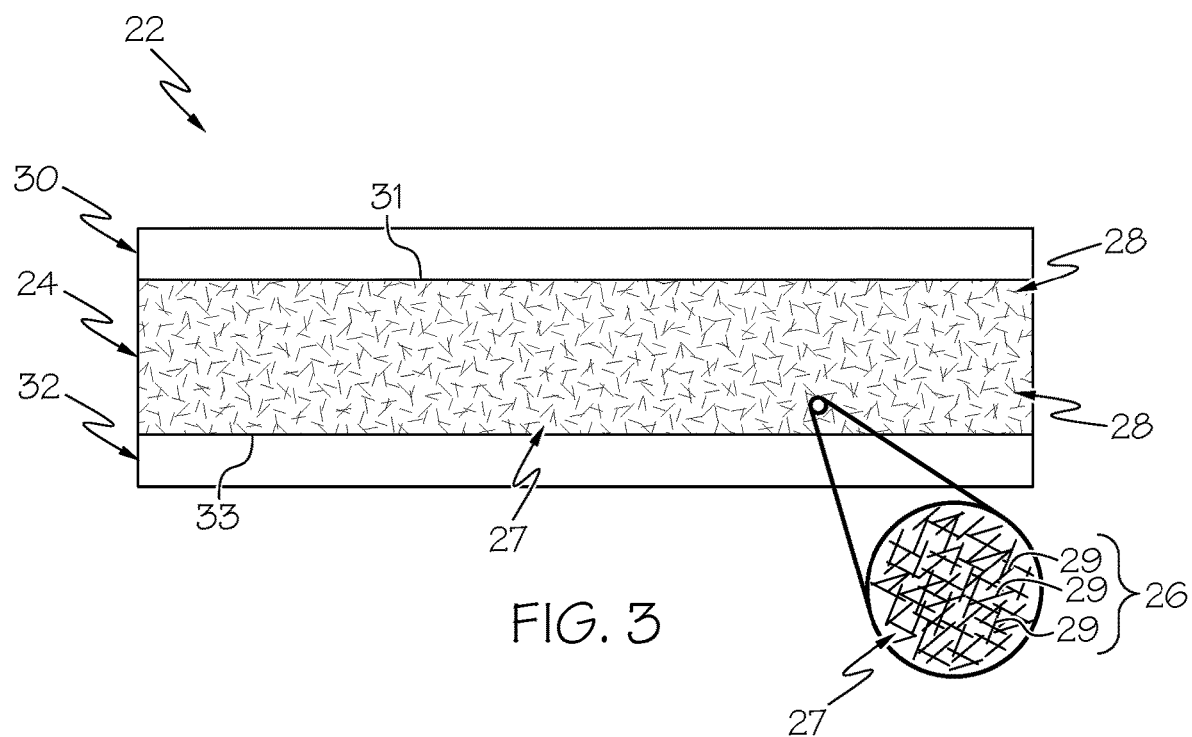
FIG. 3 is a schematic diagram showing another exemplary integrated surface protection system capable of protecting a composite structure of the aircraft of FIG. 1.

FIGS. 2 and 3 are schematic diagrams showing exemplary integrated surface protection systems, generally designated 22. Each illustrated integrated surface protection system 22 includes a single layer 24 having an electrically-conductive network 26 and a fiber reinforcement material 28. The single layer 24 can further include a matrix material 27 supporting the electrically-conductive network 26 and the fiber reinforcement material 28. The matrix material 27 can support the electrically-conductive network 26 and the fiber reinforcement material 28 by completely encapsulating and binding together the electrically-conductive network 26 and the fiber reinforcement material 28. The encapsulation by the matrix material 27 can protect the electrically-conductive network 26 and the fiber reinforcement material 28 from the environment and can also provide a smooth surface for primer adhesion and paint application to the integrated surface protection system 22. The single layer 24 has a first surface 31 and a second surface 33 opposed from the first surface 31. The matrix material 27 can be an epoxy resin, which is a thermosetting resin that is relatively strong, even at elevated temperatures, and adheres well to various fiber reinforcement material 28, such as carbon fiber and fiberglass. Additional components and features may be included in the single layer 24 without departing from the scope of the present disclosure.

The electrically-conductive network 26 includes an electrically-conductive material (or a combination of electrically-conductive materials) that imparts electrical conductivity to (or enhances the electrical conductivity of) the integrated surface protection system 22. The electrically-conductive network 26 of the integrated surface protection system 22 is configured to conduct electrical current, such as lightning current, through the integrated surface protection system 22 and away from points of attachments, electronics/electrical systems, and fuel tanks. Therefore, the electrically-conductive network 26 can provide protection against lightning direct effects.

The electrically-conductive network 26 includes a plurality of electrically-conductive elements 29 formed from the electrically-conductive material. The plurality of electrically-conductive elements 29 are electrically connected. In the illustrated examples, the plurality of electrically-conductive elements 29 are physically connected.

For example, as shown in FIG. 2, the electrically-conductive elements 29 of the electrically-conductive network 26 form a grid or mesh within the matrix material 27. Accordingly, the electrically-conductive elements 29 are physically and electrically connected to thereby form an electrically-conductive network 26.

Alternatively, as shown in FIG. 3, the electrically-conductive elements 29 of the electrically-conductive network are particles, such as flakes or segments, dispersed throughout the matrix material 27. The quantity of electrically-conductive elements 29 (particles) within the matrix material 27 is of a sufficiently high concentration to achieve physical particle-to-particle contact within the matrix material 27, thereby forming an electrically-conductive network 26.

In an example, the electrically-conductive material includes a metal. The metallic electrically-conductive material can form a physically-connected network of electrically-conductive metal elements 29 positioned throughout the single layer 24. Specifically, the electrically-conductive material of the electrically-conductive network 26 may be metallic wire segments physically connected throughout the single layer 24. As illustrated in FIG. 2, the electrically-conductive network 26 may take the form of a prefabricated mesh or grid that is added to the matrix material 27 having the reinforcement material 28. As illustrated in FIG. 2, the prefabricated mesh or grid is shown as a three-dimensional network. Alternatively, the prefabricated mesh or grid may be a two-dimensional network extending throughout the single layer 24.

In one aspect, the electrically-conductive network 26 includes at least one of copper and aluminum, which are chemically compatible with various matrix materials 27, including epoxy resin, and are electrically conductive. An amount of the electrically-conductive material included in the single layer 24 depends on a number of factors, such as the electrical conductivity of the electrically-conductive material and the arrangement of the electrically-conductive material within the single layer 24.

In another example, the electrically-conductive network 26 includes an electrically-conductive non-metal. The non-metal of the electrically-conductive network 26 can be in the form of a plurality of dispersed segments formed from the electrically-conductive non-metal. In this case, the electrically-conductive network 26 may take the form of a plurality of dispersed segments of electrically-conductive non-metal included in the single layer 24 in a sufficient amount to achieve physical segment-to-segment contact within the matrix material 27, thereby becoming electrically connected and forming an electrically-conductive network 26. In an aspect, the segments of electrically-conductive non-metal are distributed within the single layer in a random arrangement. In an example, the electrically-conductive network 26 includes at least one of graphene and carbon nanotubes, which are chemically compatible with various matrix materials 27, including epoxy resin, and are highly electrically conductive.

The fiber reinforcement material 28 is present to increase the strength of the integrated surface protection system 22. Compositionally, the fiber reinforcement material 28 can be a single material or a combination of materials. For example, the fiber reinforcement material 28 includes at least one of fiberglass and carbon fiber, which have a relatively high strength-to-weight ratio. Physically, the fiber reinforcement material 28 can take the form of a plurality of fibers, such as a plurality of fibers dispersed (e.g., randomly) within the matrix material 27 of the single layer 24. As illustrated, the fiber reinforcement material 28 can be physically separated. Alternatively, the fiber reinforcement material 28 can be physically connected.

The fiber reinforcement material 28 of the integrated surface protection system 22 can provide structural support for handling and automated lay down and can facilitate drilling holes for fastener installations. By integrating the fiber reinforcement material 28 into the single layer 24 along with the electrically-conductive network 26, the environmental durability with respect to temperature cycling is improved compared to multi-layer structures, thereby maintaining the integrity of an overlying paint layer 48.

As shown in FIGS. 2 and 3, the integrated surface protection system 22 may optionally further include an ultraviolet protection layer 30 on or within a first surface 31 of the single layer 24. As shown, the ultraviolet protection layer 30 may be a separate layer applied on the first surface 31 of the single layer 24. Alternatively, the ultraviolet protection layer 30 may be integrated into the single layer 24 such that the single layer 24 includes the electrically-conductive network 26, the fiber reinforcement material 28, and the ultraviolet protection layer 30. The ultraviolet protection layer 30 may include, for example, any organic polymer resin having ultraviolet protection properties (e.g., contain UV stabilizers) to protect the underlying materials from ultraviolet radiation.

As shown in FIGS. 2 and 3, the integrated surface protection system 22 may optionally further include a carrier layer 32 on a second surface 33 of the single layer 24. The carrier layer 32 may include suitable paper for use in an automated lay down process during which single layer 24 is applied to a composite substrate 42. In one expression, the carrier layer 32 has a silicone release agent. The silicone release agent provides a slick surface to facilitate separating the carrier layer 32 from the integrated surface protection system 22. For example, the carrier layer 32 has a cross-sectional thickness in the range of 0.1016 mm (0.004 inch) to 0.2032 mm (0.008 inch). The carrier layer 32 can be separated from the integrated surface protection system 22, such as separated from the single layer 24, and discarded. Thus, when the carrier layer 32 is separated from the integrated surface protection system 22, the surface, such as the second surface 33 of the single layer 24, of the integrated surface protection system 22 is attached to a surface of a composite substrate (e.g., the composite substrates 42 shown in FIGS. 4 and 5).

Figure 4:
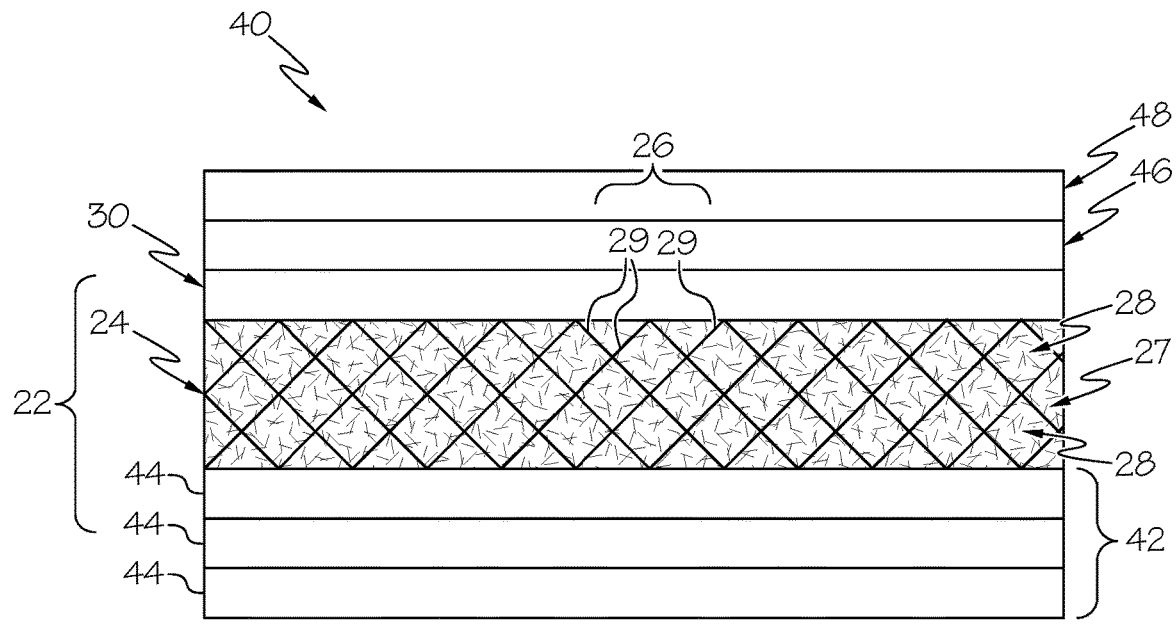
FIG. 4 is a schematic diagram showing an exemplary composite structure including the integrated surface protection system of FIG. 2.
Figure 5:
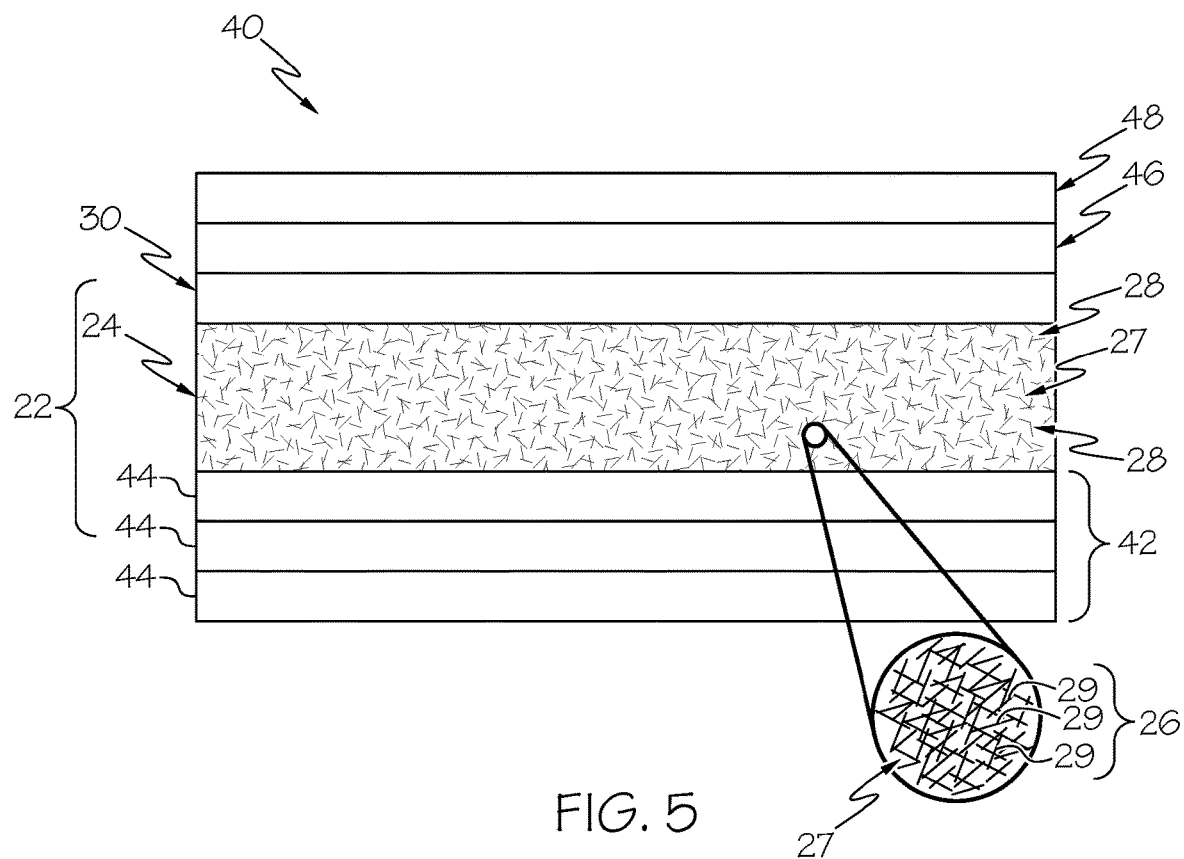
FIG. 5 is a schematic diagram showing an exemplary composite structure including the integrated surface protection system of FIG. 3.

FIGS. 4 and 5 are schematic diagrams showing exemplary composite structures, generally designated 40. The composite structures 40 include a composite substrate 42 and the integrated surface protection system 22. Accordingly, the composite structure 40 includes the composite substrate 42 and a single layer 24 including an electrically-conductive network 26 and a fiber reinforcement material 28. As shown, the composite structures 40 can further include a matrix material 27 and an ultraviolet protection layer 30 as previously described.

As shown in FIGS. 4 and 5, the composite structures 40 can further include a primer layer 46 positioned on the integrated surface protection system 22. For example, the primer layer 46 is on at least one surface of the single layer 24. The primer layer 46 is a preparatory coating applied on the single layer 24 of a composite structure 40 before painting. The primer layer 46 can ensure better adhesion of paint to the single layer 24 of a composite structure 40. In an example, the primer layer 46 includes a layer of polyurethane. In an example, the primer layer 46 has a thickness of 0.013 mm.

As shown in FIGS. 4 and 5, the composite structures 40 can further include a paint layer 48 on the integrated surface protection system 22. The paint layer 48 is a substance applied as a protective coating to at least one surface of the composite structure 40. When the composite structure 40 further includes the primer layer 46, the primer layer 46 is positioned between the single layer 24 and the paint layer 48. In an example, the paint layer 48 includes a layer of polyurethane. In an example, the paint layer 48 has a thickness of 0.13 to 0.15 mm.

The composite substrate 42 of a composite structure 40 may be (or may include), for example, any component of an aircraft or aerospace structure. For example, the composite substrate 42 may be (or may include) a nose zone 12 (FIG. 1), a fuselage zone 14 (FIG. 1), a wing zone 16 (FIG. 1), a tail zone 18 (FIG. 1), and a wing tip zone 20 (FIG. 1). Accordingly, as shown in FIG. 1, a component 13 (FIG. 1) of the aircraft 10 can include the composite structure 40.

The composite substrate 42 of a composite structure 40 may include a plurality of plies 44 (e.g., sheets or tape of carbon fiber-reinforced polymer) stacked on each other. While three plies 44 are shown in FIGS. 4 and 5, fewer than three or more than three plies 44 may be used without departing from the scope of the present disclosure. In an aspect, at least one ply of the plurality of plies 44 comprises carbon fiber-reinforced plastic.

A composite structure 40 may be formed by any suitable process. In an aspect, a composite structure 40 may be formed by manufacturing an integrated surface protection system 22 (FIGS. 2 and 3), including, for example, the single layer 24, the ultraviolet protection layer 30, and the carrier layer 32. Then, the integrated surface protection system 22 is bonded to the composite substrate 42, after which the primer layer 46 and paint layer 48 are applied. However, a composite structure 40 of the present disclosure is not limited by this process of manufacture.

Figure 6:
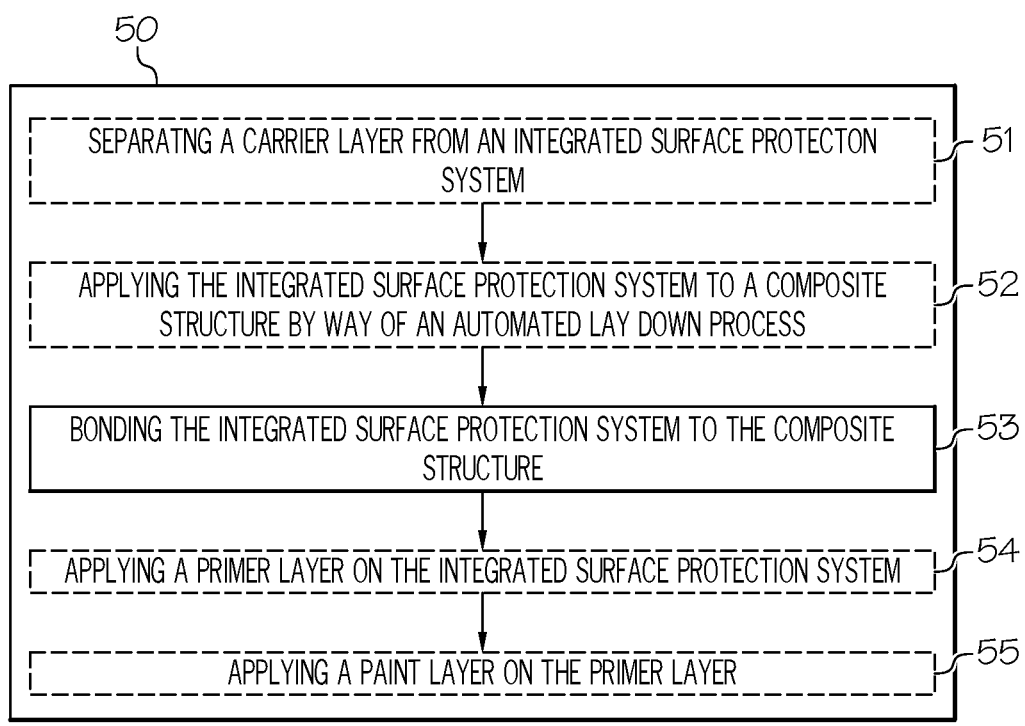
FIG. 6 is a flow diagram showing an exemplary method of protecting the composite structure using the integrated surface protection systems of FIGS. 2 and 3.

FIG. 6 is a flow diagram showing an exemplary method 50 of protecting a composite structure 40 according to an embodiment of the present description.

The method 50 includes, at Block 53, bonding an integrated surface protection system 22 to the composite structure 40, wherein the integrated surface protection system 22 includes a single layer 24 including an electrically-conductive network 26 and a fiber reinforcement material. In an example, the bonding of the integrated surface protection system 22 to the composite structure 40 includes bonding the integrated surface protection system 22 to a component 13 (FIG. 1) of an aircraft 10 (FIG. 1). The composite structure 40 includes, for example, any component of an aircraft or aerospace structure, such as a component of a nose zone 12, a fuselage zone 14, a wing zone 16, a tail zone 18, and a wing tip zone 20. In an aspect, composite structure 40 includes a plurality of plies (e.g. CFRP substrate skin plies).

As shown, the method 50 further optionally includes, at Block 51, separating a carrier layer from the integrated surface protection system 22 prior to the bonding. The separating allows the second surface 33 of the single layer 24 to be exposed for subsequent application to a composite structure 40.

As shown, the method 50 further optionally includes, at Block 52, applying the integrated surface protection system to the composite structure 40 by way of an automated lay down process (e.g., using a pick-and-place robot). Thus, in an aspect, the integrated surface protection system 22 is manufactured as an independent component and bonded to the composite structure 40.

As shown, the method 50 further optionally includes, at Block 54, applying a primer layer 46 on the bonded integrated surface protection system 22. Applying the primer layer 46 prepares the composite structure 40 for receiving a subsequent paint layer 48 and enhances adhesion between the composite structure 40 and the paint layer 48.

As shown, the method 50 further optionally includes, at Block 55, applying a paint layer 48 on the bonded integrated surface protection system 22. For example, the paint layer 48 can be applied on a primer layer 46. Applying the paint layer 48 provides a protective coating to the composite structure 40.

Accordingly, the present description can provide for structural support for handling and automated lay down, while facilitating drilling and considerably improving the environmental durability with respect to temperature cycling, thereby maintaining the integrity of an overlying paint layer. The disclosed integrated, multi-functional surface protection system and method can improve efficiency and reduce manufacturing costs, while providing protection from direct effects of lightning strikes and reducing thermal stresses.

Although various embodiments of the disclosed integrated, multi-functional surface protection system have been shown and described, modifications may occur to those skilled in the art upon reading the specification. The present application includes such modifications and is limited only by the scope of the claims.

What is claimed is:

1. A surface protection system, comprising:
   a single layer that comprises:
   a matrix material,
   an electrically conductive network, supported by the matrix material, the electrically conductive network consisting of metal, and
   a fiber reinforcement material, supported by the matrix material; and
   a releasable carrier layer on a surface of the single layer.

2. The surface protection system of claim 1, wherein the metal comprises copper.

3. The surface protection system of claim 1, wherein the fiber reinforcement material comprises at least one of fiberglass and carbon fiber.

4. The surface protection system of claim 1, wherein the matrix material comprises epoxy resin.

5. The surface protection system of claim 1, further comprising an ultraviolet electromagnetic radiation protection layer on a first surface of the single layer.

6. The surface protection system of claim 5, wherein the releasable carrier layer is on a second surface of the single layer that faces away from the first surface of the single layer.

7. The surface protection system of claim 1, wherein the single layer comprises an organic polymer resin, having ultraviolet electromagnetic radiation protection properties.

8. The surface protection system of claim 1, wherein the metal of the electrically conductive network is in a form of physically connected wire segments.

9. The surface protection system of claim 1, wherein the metal comprises aluminum.

10. The surface protection system of claim 1, wherein the fiber reinforcement material comprises fiberglass.

11. The surface protection system of claim 1, wherein the fiber reinforcement material comprises carbon fiber.

12. A method for protecting a composite structure, the method comprising a step of:
   bonding the surface protection system of claim 1 to the composite structure.

13. The method of claim 12, further comprising separating the releasable carrier layer from the surface protection system prior to the bonding.

14. The method of claim 12, wherein the step of bonding the surface protection system to the composite structure comprises bonding the surface protection system to a component of an aircraft.

15. A composite structure, comprising:
   a composite substrate; and
   a surface protection system applied to the composite substrate, wherein the surface protection system comprises:
      a single layer that comprises:
         a matrix material,
         an electrically conductive network of physically connected metal elements, wherein the electrically conductive network of physically connected metal elements is supported by the matrix material and consists of metal, and
         a fiber reinforcement material, supported by the matrix material.

16. The composite structure of claim 15, wherein the composite substrate comprises carbon fiber-reinforced plastic.

17. The composite structure of claim 15, further comprising a paint layer on the surface protection system.

18. The composite structure of claim 17, further comprising a primer layer positioned between the surface protection system and the paint layer.

19. A component of an aircraft, comprising the composite structure of claim 15.

20. A surface protection system, comprising a single layer that comprises:
   a matrix material,
   an electrically conductive network, supported by the matrix material, the electrically conductive network consisting of physically connected metal wire segments, and
   a fiber reinforcement material, supported by the matrix material.

* * * * *